Patented Feb. 19, 1935

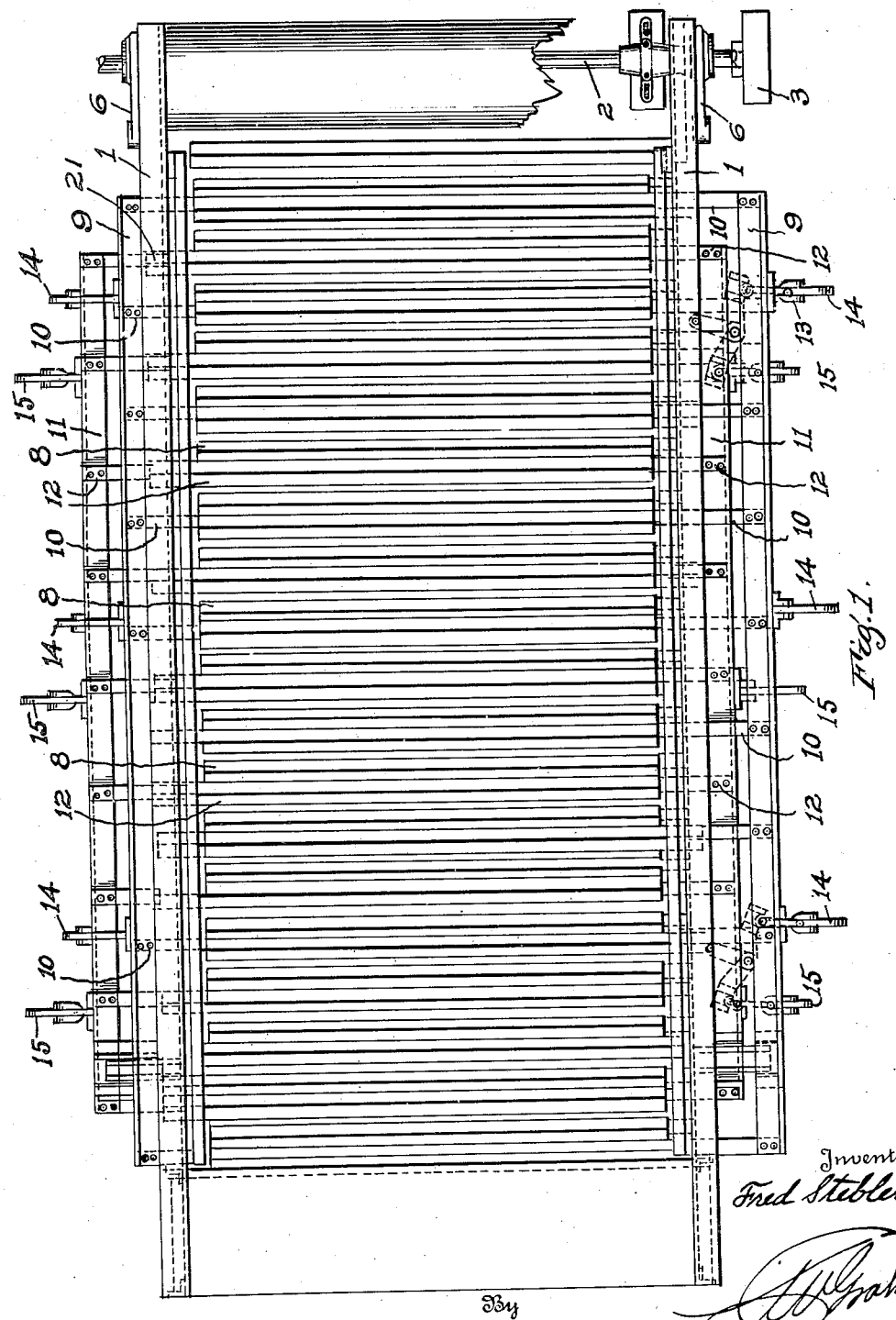

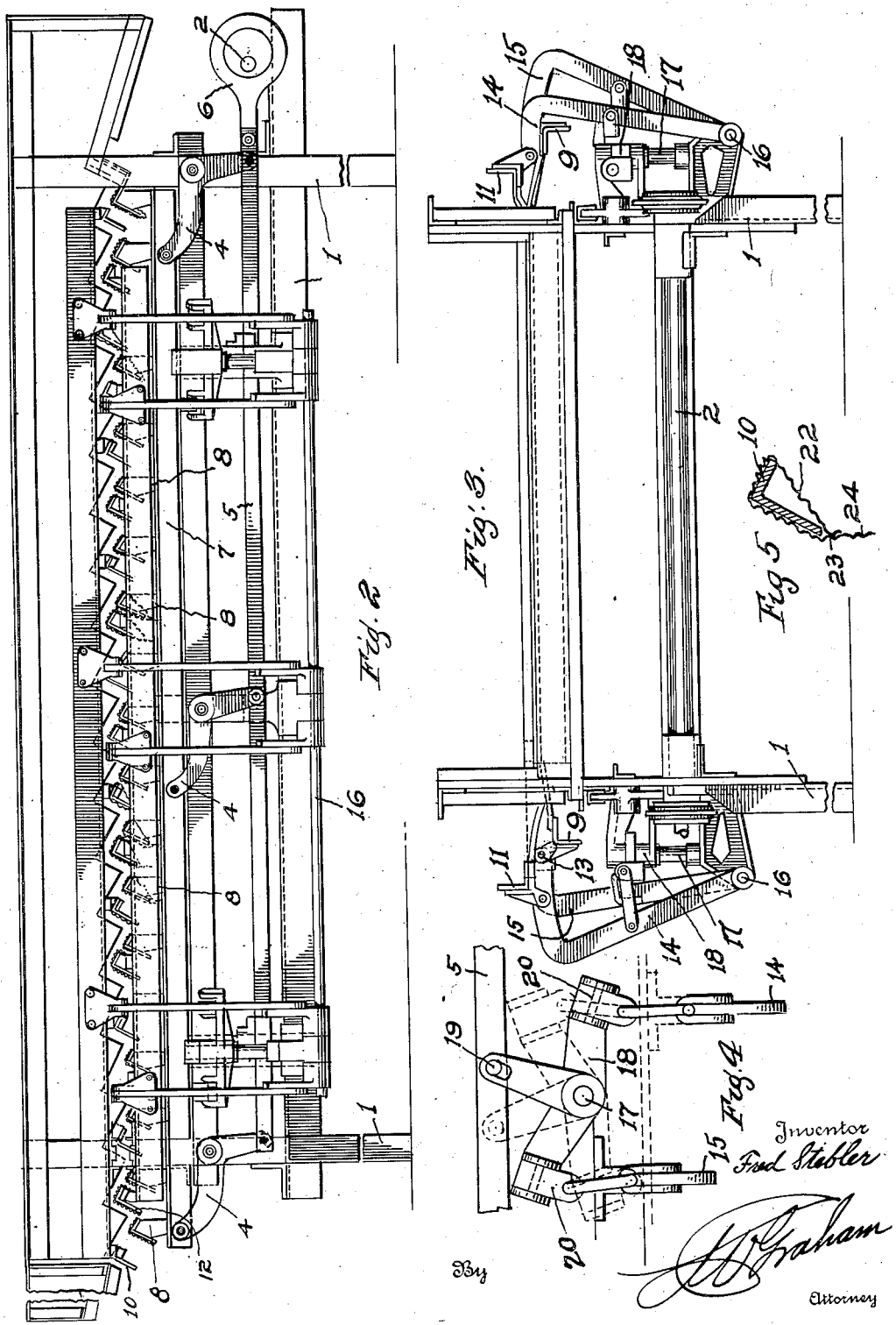

1,991,710

UNITED STATES PATENT OFFICE 1,991,710

DRYING APPARATUS

Fred Stebler, Riverside, Calif., assignor to Food Machinery Corporation, San Jose, Calif., a corporation of Delaware Application July 30, 1932, Serial No. 626,583

5 Claims. (Cl. 34—12)

This invention relates to an apparatus for drying fruit or the like wherein the fruit is advanced through the machine by impulsive and rotative movement imparted to the fruit through peculiarly arranged advancing and rolling mechanism.

In the gathering of fruit from the orchards more or less of débris is accumulated with the fruit and the fruit itself carries dust and dirt and sometimes more or less spray residue that has accumulated during the growing season so that it becomes necessary and desirable that the fruit be washed thoroughly and dried as thoroughly before being packed for market.

After the fruit comes from the washing apparatus it carries more or less moisture that adheres to the outer surfaces and it is necessary to in some efficient manner evaporate or wipe off this moisture; the wiping apparatus must work most gently with the fruit to avoid abraiding the skin surfaces and thereby opening the door for future decay. It is preferable that all surfaces coming in contact with the fruit are of a soft and yielding nature and also highly absorbent so that the fruit will be gently rubbed and the moisture absorbed rather than just wiped off, the more absorbent the drying operation, the less will the fruit skins be injured and the easier it will be to get the moisture from the pores and small recesses of the fruit coverings.

The broad general principle of the apparatus illustrating an embodiment of the invention comprises a series of bars forming a carrying surface over which the fruit is moved and rolled during the operation of drying and consists of alternately reciprocating bars moving over a horizontal plane and other alternately reciprocating bars moving through vertical planes, all of the bars lying in parallel relation to form the supporting surface.

The bars are preferably of triangular shape and their surfaces are covered with an absorbent material that hangs pendant therefrom to carry away accumulated moisture absorbed from the fruit.

The vertically movable set of bars are all mounted on a frame work that is given vertically inclined reciprocation through suitable mechanism, while the sets of bars having horizontal movement are mounted on frames that are given horizontal movement by suitable mechanism. The component of motion imparted to the several sets of bars advance the fruit through the apparatus and at the same time wipe it and roll it around on the supporting surface in a manner to contact all surfaces of the fruit with the absorbent material carried by the bars, thus thoroughly removing the adherent moisture from the passing fruit.

Because of the gentle movement imparted to the fruit by the component of motion generated by the several series of movable bars the fruit is constantly rolled over and over and all surfaces are brought into contact with the absorbent material many times during its transit through the machine. The efficiency of the drying is controlled more or less by the rapidity of absorption or by the length of time the fruit is allowed to remain in contact with the absorbent material, the time element being controlled by the length of the supporting surface or by the speed of movement imparted to the advancing bars.

The advancing bars are the set that is fastened to the vertically movable frame member on which all of these bars are positioned in a substantially horizontal plane and they are spaced to move between the bars comprising the horizontally reciprocating sets. The vertically inclined movement imparted to the advancing set of bars carries their top surfaces above the top surfaces of the horizontally reciprocating bars and thereby lifts each fruit contacted therewith and causes it to roll forward between the next pair of horizontally reciprocating bars, where the fruit remains until another vertical reciprocation when the fruit is again lifted and placed between an advanced pair of horizontally reciprocating bars. This repeated movement gradually carries the fruit over the supporting surface, continually subjecting it to the wiping and absorbing effect of the material covering the bars.

There are two frame members supporting and controlling the two sets of horizontally movable bars, each alternate bar being carried by the opposing frame member so that as the frame members are given their horizontal reciprocation the sets of bars are always moving in opposite directions. This component of motion generated by the several sets of bars moving in unison insures that each fruit is rolled over and over many times during its transit through the machine. During the entire wiping and absorbing operation no fruit is ever brought into contact with any abrading or skin damaging material or part of the apparatus.

It is therefore an object of the invention to provide a drying apparatus for fruit or the like that rolls each individual fruit over and over during the drying operation.

It is also an object of the invention to provide a fruit drying apparatus wherein the fruit is constantly in contact with wiping and drying material.

It is also an object of the invention to provide a highly efficient fruit drying apparatus wherein the fruit is given a component of motion that will roll it around over the drying surface and at the same time gradually advance it through the apparatus.

It is also an object of the invention to provide a highly efficient drying apparatus wherein the moisture carried by washed fruit is almost wholly absorbed instead of wiped therefrom.

It is also an object of the invention to provide a highly efficient fruit drying apparatus wherein a series of sets of parallel members are given a component of motion whereby to advance fruit resting thereon through the apparatus and at the same time roll and turn the fruit so all surfaces will contact with the drying and absorbing means.

It is also an object of the invention to so arrange a series of sets of movable bars and impart movement thereto so that each set is moving in a different direction than any of the other sets.

It is an object of the invention to provide a fruit drying apparatus wherein the fruit is moved through the machine by intermittent impulses and the periods between impulses is utilized for giving each fruit a drying treatment.

It is also an object of the invention to provide a fruit drying apparatus having sets of movable bars forming a supporting and treating surface for a stream of constantly advancing fruit and for simultaneously imparting to the fruit vertical, rolling and horizontal movement.

With such objects in view as may be inherent in the invention, consisting in the parts and combinations hereinafter set forth and claimed, it is understood that the several necessary parts, and combinations constituting the same may be varied in their placement and proportions and general arrangement without departing from the scope and nature of the invention, and in order to make the invention more clearly understood there are shown, somewhat diagrammatically, in the accompanying drawings means and mechanism for placing the same in concrete form without limiting the improvements in their application to the particular construction chosen to illustrate the invention.

Reference being now had to the accompanying drawings a clearer and better understanding of the invention will be had.

Figure 1 represents a plan of an apparatus embodying the invention.

Figure 2 is a side elevation of the apparatus.

Figure 3 is an end elevation of the apparatus.

Figure 4 is a plan detail of the mechanism imparting horizontal reciprocation to the supporting bars.

Figure 5 is a detail of an end of one of the bars to show the manner of attaching and applying the absorbent material.

The numeral 1 represents a general frame work for supporting the entire operative mechanism. 2 is a cross shaft extending across the entire end of the frame 1 and is the main drive shaft for imparting motion to the entire operative mechanism. This shaft may be conveniently driven by a pulley 3 and suitable belt connection. Disposed along each side of the apparatus are rock levers 4, pivotally mounted on the standards of the frame 1, the pendent ends of the levers 4 are secured pivotally, to a reach bar 5 which connects them all for simultaneous movement. The reach bar 5 is given reciprocating movement by the eccentrics 6 and being suspended from the pendent ends of the rock levers 4, its reciprocating movement imparts a rocking movement to the rock levers 4. The upper ends of the rock levers 4 are pivotally secured to a frame member 7 on which are secured the cross bars 8, which form the set of advancing bars for moving the fruit through the apparatus. The movement imparted to the rock levers 4 will carry the upper ends in an inclined vertical direction determined by the arc described by the ends of the rock levers, and since all of the rock levers on both sides of the machine are connected to the reach bars 5 and the bars 5 are given simultaneous movement by the two eccentrics it is seen that the frame carrying the cross bars 8 will receive a vertically inclined reciprocation. The position of the frame 7 and the bars 8 in Fig. 2 are at their lowest. When the eccentrics 6 are in a position 180 degrees from the position shown they will be at their highest.

The numeral 9 represents a frame member that is adapted to support one set of the cross bars that help to form the fruit supporting and treating surface, 10 indicating how these bars are spaced on the frame and extend across the top of the apparatus.

11 represents another frame member carrying a like number and arrangement of cross bars 12 which are alternately arranged with the bars 8 and 10, the three sets of bars forming the entire support for the fruit as it is treated and carried through the apparatus.

The frame member 9 is supported through the pivots 13 with the L shaped rocker arms 14. These arms 14 hold the frame member 9 and the cross bars 10 in operative relation with the other sets of bars 8 and 12.

The frame member 11 is likewise supported on the rocker arms 15 which hold this frame and the cross bars 12 in operative relation with the other sets of bars.

The rocker arms 14 and 15 are pivoted at 16 and are given rocking movement through the medium of the vertical rock shafts 17 carrying the rocking members 18 which have a pivotal connection 19 with the reach bar 5. As the reach bar 5 is given reciprocation by the eccentric 6 the member 18 is rocked thereby and the arms 14 and 15 given reciprocation to move the supporting bars for the fruit. The universal coupling 20 serves to give free movement to the connecting parts.

The bars 8 having only vertical movement are made just long enough to fill the space between the side confines of the apparatus, but the bars 10 and 12 to which are imparted horizontal reciprocatory movement are made longer than the side confines of the apparatus so that when they are at their extreme movements the ends will not pass inside of the ends of the bars 8, this arrangement provides the top supporting surface of a uniform width at all times. The dotted ends of the bars 12 are clearly shown in Fig. 1, as extending under the frame member 1 as at 21.

Reference has been made to the surface covering of the bars with an absorbent material to absorb rather than wipe the moisture from the fruit. It should also be mentioned that this fabric material serves another very important purpose in that it provides a soft yielding surface for the fruit and eliminates all possibility of injuring the skins during the rolling and advancing forward through the machine. This cushioned surface covering the entire supporting area of the machine thus serves the double purpose of acting as a rapid absorbent material as well as a cushioning surface for supporting and moving the fruit without the least possible danger of abrading or bruising the tender skins of the fruits and thereby opening the door for rapid decay.

Operation

Fruit or any material to be treated is supplied to the apparatus from the previous machine over the runway at the left of Figure 2 down which it rolls and lands gently on the first of the cross bars 8, 10 and 12 and since the bars 10 and 12 have reciprocating movement in opposed directions the fruit is immediately rolled over on the bars and then as the bars 8 begin their vertical movement the fruit resting in the space between a 10 and 12 bar and on an 8 bar, is raised up by the advancing 8 bar and caused to roll over the 12 bar and land in the space between another 10 and 12 bar and as the 8 bar recedes to its lowest position the fruit is held between the 10 and 12 bars and rolled over and over on the absorbent material covering the tops and sides of the bars and by this multitude of contacts the moisture is quickly absorbed from the surfaces of the fruit. The continued intermittent movement of the fruit forward through the apparatus by the 8 bars and the continued rolling given to the fruit by the alternate reciprocation of the 10 and 12 bars presents the fruit in all possible positions to the absorbent material covering the tops and sides of the bars so that the last vestige of moisture can be most efficiently removed, and this desirable result is accomplished with the least possible danger of abrading or in the least injuring the delicate skin surfaces of the fruit through which at a later period, infection would enter to hasten the decay of the fruit.

Although all of the supporting bars are continually moving and the fruit is being constantly rolled around and intermittently moved forward the moving supporting surface remains in substantially a uniform plane and provides a constantly changing surface for the absorption of the moisture from the fruit surfaces.

The manner of securing the absorbent material to the moving bars as previously mentioned is clearly shown in Fig. 5 which is a somewhat enlarged view of one end of a bar. The fabric 22 is wrapped around the top and sides of the bar and the one lower edge may if desired be pinned or sewed to the other portion as at 23 and the pendent flap 24 will act as a drip edge from which the accumulated moisture will gradually drip from the fabric.

During the foregoing description mention has been made particularly as to the treatment of fruit but applicant wishes it understood that his device is applicable to the handling and treatment of any rollable article and for any purpose other than drying. For example the device would be especially adapted, without any change, to be used as a coating machine for applying a thin fluent coating to rollable articles by simply letting the drip edges of the fabric 24 to dip into a coating solution, or about half of the drip edges could dip into a solution and the other end of the machine could be used for polishing or drying. Other uses are quite obvious.

What I claim as new and desire to secure by Letters Patent is:

1. A means for drying fruit or the like comprising a fruit supporting member having a fabric covering to absorb moisture from fruit in contact therewith, the said fabric covering having a drip edge suspended from the lower portion of said supporting member and out of contact with the fruit for conveying the absorbed moisture from said fruit by capillary movement.

2. An apparatus for drying fruit or the like comprising a horizontally disposed fruit supporting surface made up of spaced bars, a fixed frame work, a single power shaft across the end thereof, eccentrics mounted on said power shaft, a series of rocker arms pivoted to said fixed frame work to rock in vertical planes, reach bars extending horizontally from said eccentrics, each reach bar connected to a plurality of said rocker arms, a movable frame above said fixed frame also connected to said rocker arms, a series of said horizontally disposed supporting bars spaced apart and connected to said movable frame, a series of said horizontal bars positioned between the bars connected to said movable frame, vertically positioned pairs of bar oscillating rocker arms pivotally mounted on said fixed frame to move in vertical planes at substantially right angles to the plane of movement of said first mentioned bars, tie bars connecting one of each pair of said rocker arms and forming the sole support for the horizontal bars not supported by said movable frame, rock shafts mounted on said fixed frame and having connection with said reach bars and said vertically positioned bar oscillating rocker arms, movement being imparted to said movable elements directly by said single power shaft.

3. An apparatus for drying fruit or the like comprising a horizontal fruit supporting surface made up of a series of spaced movable bars, a soft yielding absorbent fabric material covering said supporting bars to prevent injury and abrasion to delicate fruit skins, the fabric on each bar being an independent piece separated from all other bars, one edge of each piece of fabric extending below the point of fruit contact and acting as a drip edge to convey moisture away from the fabric in contact with the fruit surfaces, with means for imparting both vertical and horizontal movement to the fabric surfaces to convey fruit along said supporting surface and to roll each fruit as so conveyed to bring all surfaces into contact with the said absorbent fabric.

4. An apparatus for drying fruit or the like comprising a series of spaced horizontally disposed bars forming the support for a mass of fruit, means for moving said spaced bars through arcuate paths as well as vertical and horizontal paths, a soft yielding absorbent material covering each supporting bar to prevent injury or abrasion to the skins of the fruit, the fabric on each bar being a separate and independent piece of material, one edge of each piece of absorbent material extending below the supporting surface to form a drip edge to convey moisture away from the absorbent material contacting with the fruit, the component of motion of said bars tending to roll and convey the fruit to bring all surfaces in direct contact with the soft yielding supporting surfaces to remove the moisture therefrom.

5. An apparatus for drying fruit or the like comprising a fruit supporting surface made up of a series of spaced bars, the bars being spaced a distance less than the smallest fruit handled, each of said supporting bars being covered with a soft yielding absorbent material to prevent injury to the surfaces of delicate fruit, the material on each bar extending below the point of fruit contact to act as a drip portion to convey away moisture absorbed by the material in direct contact with the fruit by capillary flow, means for imparting arcuate movement to said bars in both vertical and horizontal directions to thereby assist in rolling the fruit over and over to bring all surfaces repeatedly into contact with the absorbent material.

FRED STEBLER.